United States Patent [19]

Vande Castle

[11] E Patent Number: Re. 31,853

[45] Reissued Date of Patent: Mar. 26, 1985

[54] PACKAGE FLAP FOLDING APPARATUS

[75] Inventor: Jerome J. Vande Castle, Green Bay, Wis.

[73] Assignee: FMC Corporation, San Jose, Calif.

[21] Appl. No.: 942,233

[22] Filed: Sep. 14, 1978

Related U.S. Patent Documents

Reissue of:

[64] Patent No.: 4,079,572
Issued: Mar. 21, 1978
Appl. No.: 778,657
Filed: Mar. 17, 1977

[51] Int. Cl.[3] ..... B65B 57/00; B65B 51/00

[52] U.S. Cl. ..... 53/53; 53/379; 53/388

[58] Field of Search ..... 53/373, 378, 379, 371, 53/388, 232, 233, 234, 374, 53; 198/473, 407, 408, 481, 649, 607, 652

[56] References Cited

U.S. PATENT DOCUMENTS

| | | | |
|---|---|---|---|
| 1,046,058 | 12/1912 | Duell | 198/473 |
| 1,518,534 | 12/1924 | Metcalf | 53/379 |
| 1,961,697 | 6/1934 | Little | 198/407 |
| 2,078,619 | 4/1937 | Van Buren | 53/388 X |
| 2,407,313 | 9/1946 | Malhiot | 53/379 X |
| 2,421,373 | 6/1947 | Cozza | 53/388 |
| 2,568,073 | 9/1951 | Koppel et al. | 198/649 |
| 2,639,916 | 5/1953 | Anness | 271/35 |
| 2,797,092 | 6/1957 | Welsh | 271/101 |
| 2,913,864 | 11/1959 | Malhiot | 53/387 |
| 3,089,298 | 5/1963 | Neuendorf et al. | 53/373 X |
| 3,209,514 | 10/1965 | Schmermund | 53/230 |
| 3,288,266 | 11/1966 | Bradley | 198/408 |
| 3,459,289 | 8/1969 | Roseman | 198/628 X |
| 3,552,094 | 1/1971 | Daily et al. | 53/376 |
| 3,628,646 | 12/1971 | Schuster | 198/481 X |
| 3,641,735 | 2/1972 | Daily et al. | 53/537 |
| 3,805,489 | 4/1974 | Lieder et al. | 53/378 |
| 3,894,732 | 7/1975 | Müller | 271/10 |
| 4,011,155 | 3/1977 | Feurstein et al. | 53/53 X |

FOREIGN PATENT DOCUMENTS

| | | | |
|---|---|---|---|
| 384740 | 10/1973 | U.S.S.R. | 53/374 |

*Primary Examiner*—Horace M. Culver
*Attorney, Agent, or Firm*—Niro, Jager & Scavone

[57] ABSTRACT

An apparatus for reliably folding the protruding end flaps of an article filled package against the body of the package and for then securing the end flaps to the package. The apparatus includes a package gripping feed conveyor optionally having a reject mechanism therein. The gripping conveyor receives a line of packages from a wrapping machine and feeds these into pusher flights of a transverse conveying system. The reject mechanism can be manually or automatically actuated and de-actuated to reject defective product and/or packages. The feed conveyor maintains control of the non-rejected packages only until the forward end of each of the packages moves against or near an abutment in a transfer section which urges the forward flaps downwardly as the packages are moved upwardly and transversly out of the transfer section over a plate by the then arcuately moving pushers of a transverse flap folding conveyor which subsequently folds and seals both end flaps against the body of the associated packages. The pushers move the completed packages horizontally along a package supporting plate which extends beyond the discharge end of the folding conveyor for accommodating a plurality of abutting packages as the pushers move downwardly below the support plate. Adjustment means are provided to adjust the feed conveyor and flap folding conveyor to accommodate packages of different widths and lengths.

22 Claims, 12 Drawing Figures

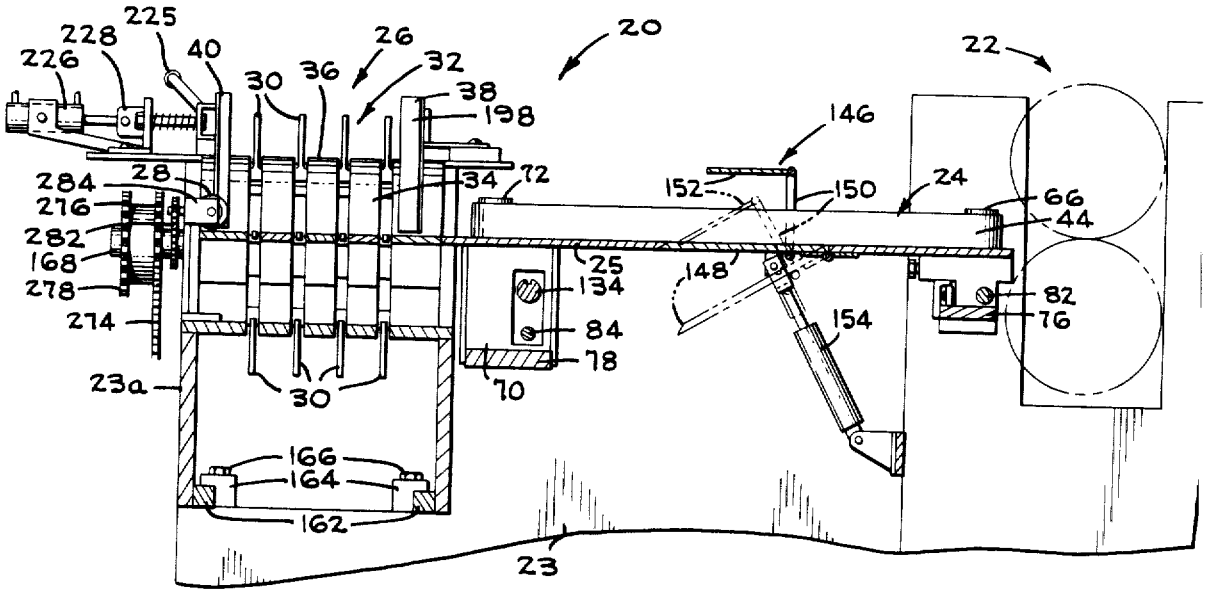
FIG_2
FIG_3
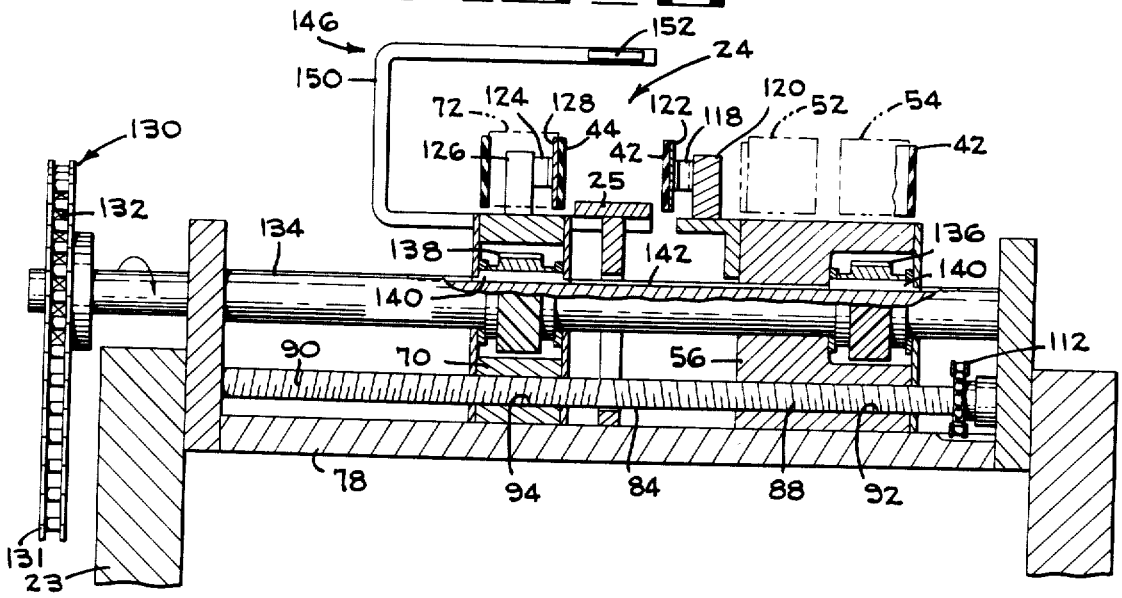

FIG_7
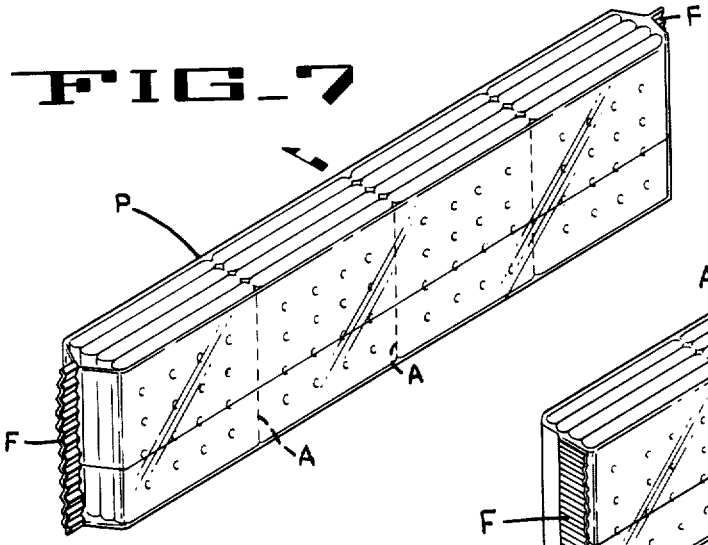
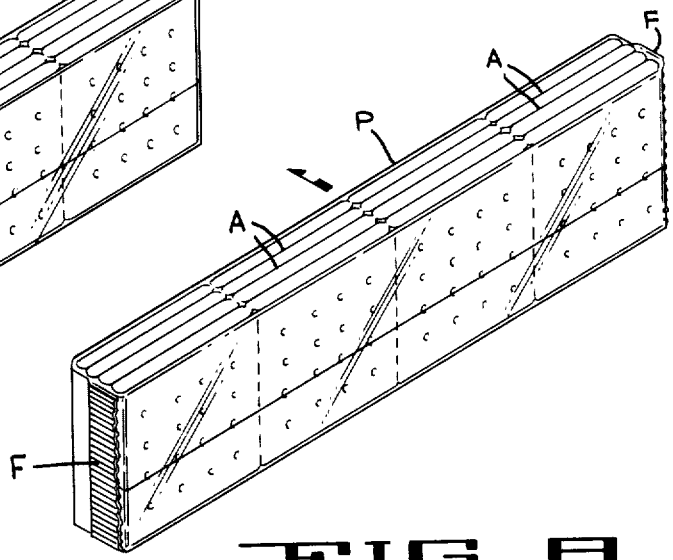
FIG_8
FIG_9
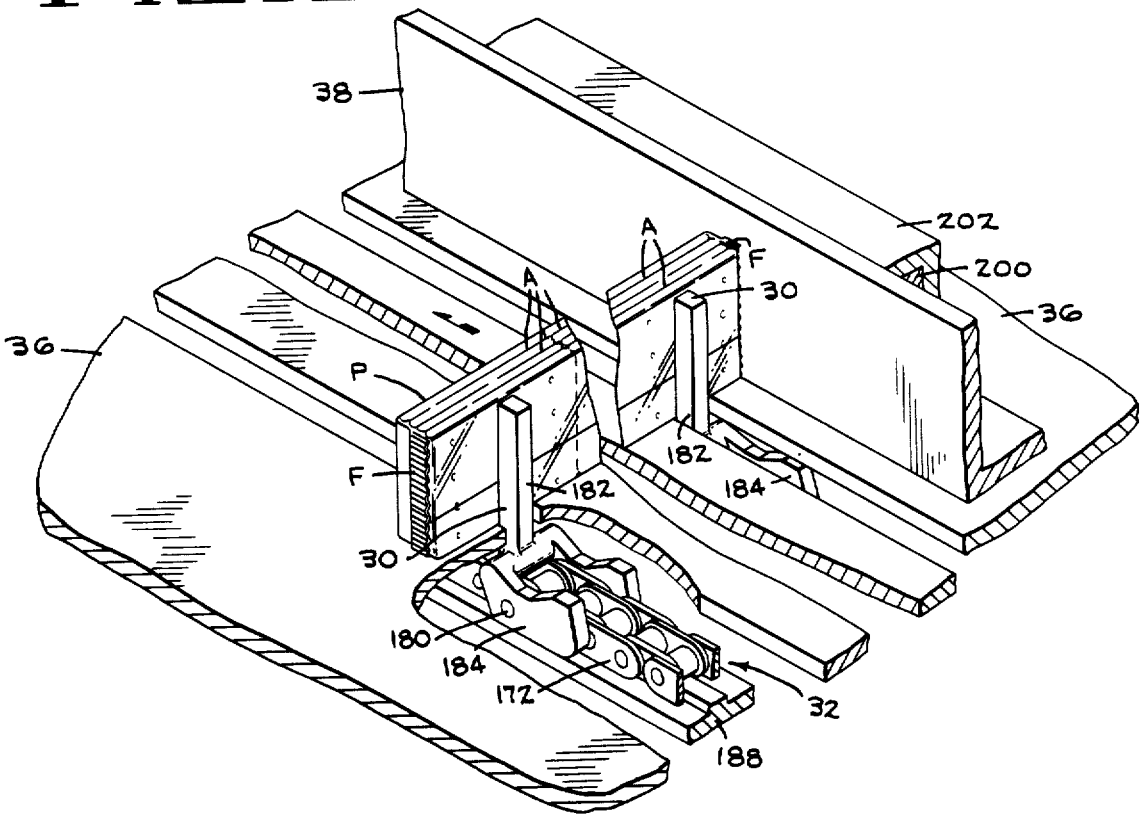

PACKAGE FLAP FOLDING APPARATUS

Matter enclosed in heavy brackets [ ] appears in the original patent but forms no part of this reissue specification; matter printed in italics indicates the additions made by reissue.

BACKGROUND OF THE INVENTION

1. Field of the Invention

This invention pertains to the packaging art and more particularly relates to apparatus for folding and then sealing the protruding end flaps of a package to the ends of the body of the package.

2. Description of the Prior Art

Apparatus for packaging articles in packages formed from thermosealing wrapping material is disclosed in my U.S. Pat. No. 3,641,857 which issued on Feb. 15, 1972, and in U.S. Pat. No. 2,546,721, which issued to Campbell on Mar. 27, 1951. Similar machines are disclosed in assignees Aterianus application Ser. No. 581,993, filed on May 29, 1975 and Nack et al Ser. No. 691,662, filed on June 1, 1976. The disclosures of these patents and applications are incorporated herein by reference. These patents disclose crimped extended end packaging machines which form packages from thermosealing materials with end flaps thereof crimped and extending outwardly. When in this form, the packages were heretofore considered complete and were sold to customers with the ends extended.

SUMMARY OF THE INVENTION

The package flap folding apparatus of the present invention receives packages, known in the art as "crimped extended end packages," from the packaging machine and includes a feed conveyor which frictionally engages the sides of the packages and maintains control of the packages until they have been advanced against or near to an abutment in a transfer section at which time the forward end flaps are urged downwardly as the packages are moved upwardly and transversely in arcuate fashion by the pusher flights of a transverse conveyor that subsequently folds and seals both end flaps to the package ends.

It has been determined, especially with heat sealed packages, that when starting, stopping, or jogging the packaging machine, the packages frequently lose their spacing on the feed conveyor or have poor seals. In order to control quality and not to jam the flap folding apparatus, a reject mechanism associated with the feed conveyor can be programmed to automatically reject an initial group of packages after start up. After the machine has returned to normal operation, an operator may manually operate the reject mechanism to reject packages whenever he visually detects conditions that would cause production of defective packages. Acceptable packages are fed into a flap folding and sealing conveyor which moves the properly spaced and sealed packages upwardly and transversely in arcuate fashion from the feed conveyor and subsequently folds and seals both end flaps against the body of each package. Adjustment means are provided to adjust the feed conveyor and flap folding and sealing conveyor to accommodate packages of different widths and lengths.

In the illustrated preferred embodiment of the invention, the packages are formed from a thermosealing material with the end flaps projecting outwardly, which flaps after being folded are sealed to the adjacent ends of the package by heat from heat sealing shoes. The packages are advanced between the folding and heating shoes by a series of pushers which are pivotally connected to endless conveyor chains. The pushers are guided to first pick up the crimped extended end packages from a slotted deadplate, transfer the packages around a 90° turn over a package supporting plate at which time the end flaps frictionally engage the folding and sealing shoes. After movement through the sealing section, the completed packages are advanced into abutting relationship on an accumulating section of the package supporting plate which projects outwardly beyond the discharge end of the conveyor. As the pushers move to a point adjacent the discharge end of the conveyor they are allowed to freely pivot and move below the package supporting plate to prevent damage to the accumulated articles. The rate of movement of packages through the apparatus is about 150–240 packages per minute. Packages that are 4 inches long have been run successfully at 240 packages per minute, while packages 6 inches long have been run at 200 packages per minute.

If the crimped extended end packages are made from a non-thermosealing material such as metal foil or the like, heat is not required and the extended ends are merely moved between folding shoes causing the end flaps to take a permanent set and lie against the associated ends of the packages.

An object of the present invention is to provide an apparatus for folding both of the extended end flaps of a crimped extended end package against the associated end surfaces of the package body.

Another object is to provide an apparatus for sealing the folded ends of the package to the package ends at high speeds.

Another object is to provide an apparatus which delivers the packages on-edge in abutting relationship to facilitate cartoning and casing operations while minimizing floor space requirements.

Another object is to enable production of packages without extended ends to facilitate cartoning and casing operations and to minimize the size requirements for cartons and cases.

Another object is to provide apparatus that produces packages that are not likely to hang-up in vending machines because the ends are not extended.

Another object is to provide end-flap folding and sealing apparatus that can accommodate both flat and round ended packages.

Another object is to provide apparatus to enable production of packages that have positive end seals characteristic of crinkled extended end packages but that also have the good appearance of a package having no extended end flaps.

Another object is to provide apparatus with mechanism for automatically and manually rejecting defective packages so that they will not enter the flap folding and sealing portions of the machine.

Another object is to synchronize the reject means with the package position so as to avoid jam-ups.

Another object is to provide apparatus for positively transferring packages into the flights of a transverse conveyor for subsequently folding the end flaps and sealing the flaps to the ends of the package.

BRIEF DESCRIPTION OF THE DRAWINGS

FIG. 2 is a longitudinal section taken along lines 2—2 of FIG. 1 through the center of the feed conveyor.

FIG. 3 is an enlarged transverse section taken along lines 3—3 of FIG. 1.

FIG. 7 is an enlarged perspective of a crimped extended end package as it appears upon entering the folding apparatus of the present invention.

FIG. 8 is an enlarged perspective of the package of FIG. 7 after the end flaps have been folded and sealed against the ends of the package.

FIG. 9 is an enlarged perspective of a package with parts cut away illustrating both ends folded and sealed and further illustrating portions of the pushers, package supporting slide plate and a portion of one heat sealing shoe.

DESCRIPTION OF THE PREFERRED EMBODIMENT

Figure 1:
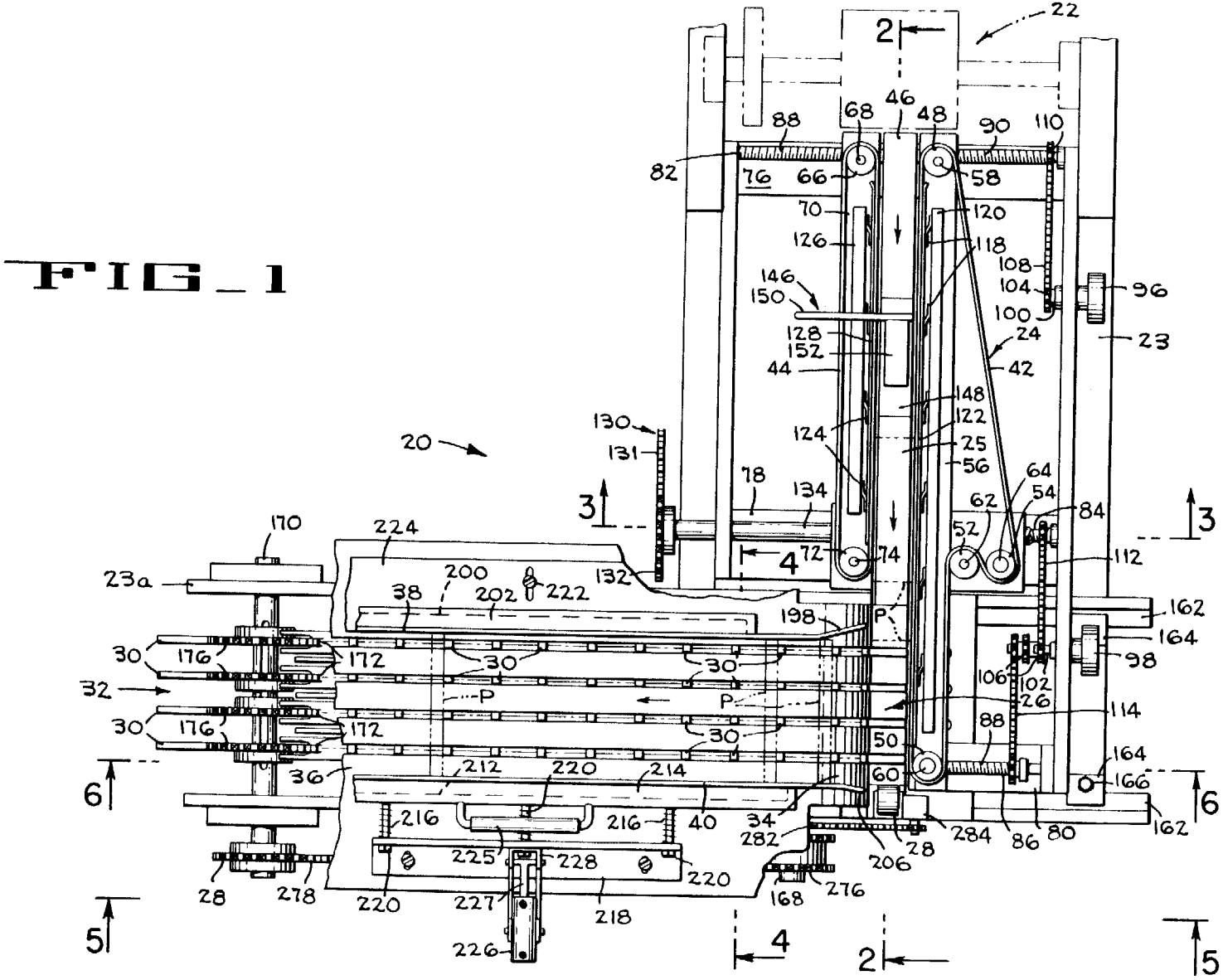
FIG. 1 is a plan of the flap folding apparatus of the present invention with certain parts of the folding conveyor being cut away.

The package flap folding apparatus 20 (FIG. 1) of the present invention is associated with the packaging machine 22 (FIGS. 1 and 2) of the type disclosed in the above-mentioned U.S. Pat. Nos. 3,641,857 and 2,546,721. The packaging machine 22 includes a continuously driven pusher type conveyor (not shown) that moves a single file of packages P formed around articles A into the flap folding apparatus 20 when the packages have their end flaps F extended as illustrated in FIG. 7.

In general, the flap folding apparatus 20 (FIG. 1) is supported by two main frames 23, 23a and comprises a feed conveyor 24 which receives packages from the packaging machine 22 and spaces the packages from each other by accelerating them along a deadplate 25 to provide about ½ package spacing between packages before they are moved into a transfer station or section 26. While the feed conveyor 24 is still maintaining control over the packages, the forward end flap F of each package is urged downwardly upon impact with an abutment means illustrated as a roller 28 having a downwardly driven abutment surface. The packages P are then lifted by pushers 30 of a driven endless flap folding and sealing conveyor 32 and are transferred 90° over an arcuate portion 34 of a slotted deadplate 36. Immediately after this arcuate transfer, the end flaps F engage folding shoes 38, 40 and engage heated portions of the shoes (if the wrapping material is a thermosealing material) to fold and seal the flaps F against the body of the packages P as illustrated in FIG. 8.

More paraticularly, the illustrated feed conveyor 24 (FIGS. 1 and 3) comprises a long endless belt 42 which extends into the transfer section 26 and a short endless belt 44 that terminates short of the transfer section. The belts 42 and 44 have parallel linear portions that are positioned to engage the sides of the packages P and drive them along a feed path 46 over the deadplate 25 in the direction indicated by the arrows in FIG. 1. The long endless belt 42 is trained around pulleys 48, 50, 52 and 54 rotatably mounted to a transversely adjustable sub-frame 56 by shafts 58, 60, 62 and 64, respectively. The pulley 54 is a driven pulley that is keyed to its shaft 64, and the shaft is journaled in the sub-frame 56; whereas the other pulleys are idler pulleys journaled on their shafts with the shafts secured to the sub-frame 56.

Similarly, the short belt 42 is trained around an idler pulley 66 journaled on a shaft 68 secured to a second sub-frame 70, and a driven pulley 72 keyed to a shaft 74 journaled in the sub-frame 70.

The sub-frames 56 and 70 are slidably mounted on three transverse bars 76, 78 and 80 of the main frame 23, and are transversely adjusted to accommodate packages of different widths by a pair of full length shafts 82, 84 and a stub shaft 86 journaled in the main frame 23. Each shaft 82, 84 has right hand threads 88 and left hand threads 90 thereon that are received in internally threaded holes 92, 94 in the sub-frames 56 and 70, respectively. The stub shaft 86 is threadedly received in the sub-frame 56 by right hand threads 88. As shown in FIG. 1, a pair of hand wheels 96, 98 are secured to stub shafts 100, 102 that are journaled in the main frame 23 and have a sprocket 104 and a multiple sprocket 106, respectively, keyed to their opposite ends. A chain 108 is trained around the sprocket 104 and a sprocket 110 keyed to the shaft 82. Other chains 112 and 114 are trained around the multiple sprocket 106, and sprockets keyed to the shafts 84 and 86, respectively. Thus, if an operator desires to change the spacing between the parallel runs of the endless belts 42 and 44 to accommodate packages of different widths, the operator manually rotates the two hand wheels 96, 98 in one direction to widen the gap between article contracting surfaces of the belts, and in the opposite direction to narrow the gap.

In order to assure that the belts 42, 44 firmly grip the packages, a plurality of leaf springs 118 are disposed between a support bar 120 rigidly secured to the sub-frame 56 and a belt guide 122, and resiliently urge the package contacting run of the belt 42 firmly against one side of the packages. Similarly, leaf springs 124 are disposed between a support bar 126 of a sub-frame 70 and a belt guide 128 to firmly urge the package contacting run of the belt 44 firmly against the packages. Thus, by proper adjustment of the handwheels 96, 98, the operator can assure that the belts 42, 44 adequately grip and advance the packages into the transfer section 26 in timed relation with the other components of the flap folding apparatus 20.

The package contacting runs of the belts 42, 44 are driven in the direction indicated by the arrow in FIG. 1 by a drive mechanism 130 diagrammatically illustrated in FIG. 10 which includes a chain drive 131 connected to the drive of the packaging machine 22 as will be described hereinafter. The chain drive 131 includes a sprocket 132 keyed to a shaft 134. The shaft is journaled in the main frame 23 and slidably receives a pair of helical gears 136 and 138. The gears 136, 138 are held from transverse movement within subframe 56 and 70, respectively. Each gear 136, 138 has a key 140 secured thereto and slidably received in a keyway 142 in the shaft 134. The gears 136, 138 mesh with helical gears 136', 138' (FIG. 10) secured to the belt drive shafts 64 and 74. Thus, the axially slidable gears 136, 138 permit transverse adjustment of the belts 42, 44 while the belts are being driven by the shaft 134.

The above described unequal length sidebelt conveyor could be replaced with a single side chain having pivotable or retractable dogs operating in conjunction with a shorter sideguide in order to transfer the packages with pushers. Either conveying alternative positively transfers the package all the way into the flights of the transverse conveyor.

As mentioned previously, during starting and stopping of the wrapping machine, the packages are frequently improperly positioned or improperly sealed. Accordingly, a reject mechanism 146 (FIGS. 2, 3 and 11) can be provided to intercept these packages and deflect them out of the feed conveyor 24. In the illustrated design, the reject mechanism comprises a floor plate 148 that is hinged to the deadplate 25, and during normal operation closes a slot in the deadplate 25 as indicated in solid lines in FIG. 2. A U-shaped bracket 150 (FIG. 3) is welded to the floor plate 148 and supports a package deflecting plate 152 which is normally positioned above the path of movement of the packages as indicated in solid lines in FIGS. 2 and 3. It will be appreciated that the U-shaped bracket permits belt 44 to be adjusted a considerable distance outwardly of the positions illustrated in FIG. 3 thereby permitting the handling of quite wide packages. A pneumatic reject cylinder 154 is pivotally connected between the floor plate 148 and the packaging machine 22 and when activated will pivot the reject mechanism between the solid line inactive position and dotted line reject position illustrated in FIG. 2. The control system for operating the reject cylinder will be described hereinafter.

Figure 4:
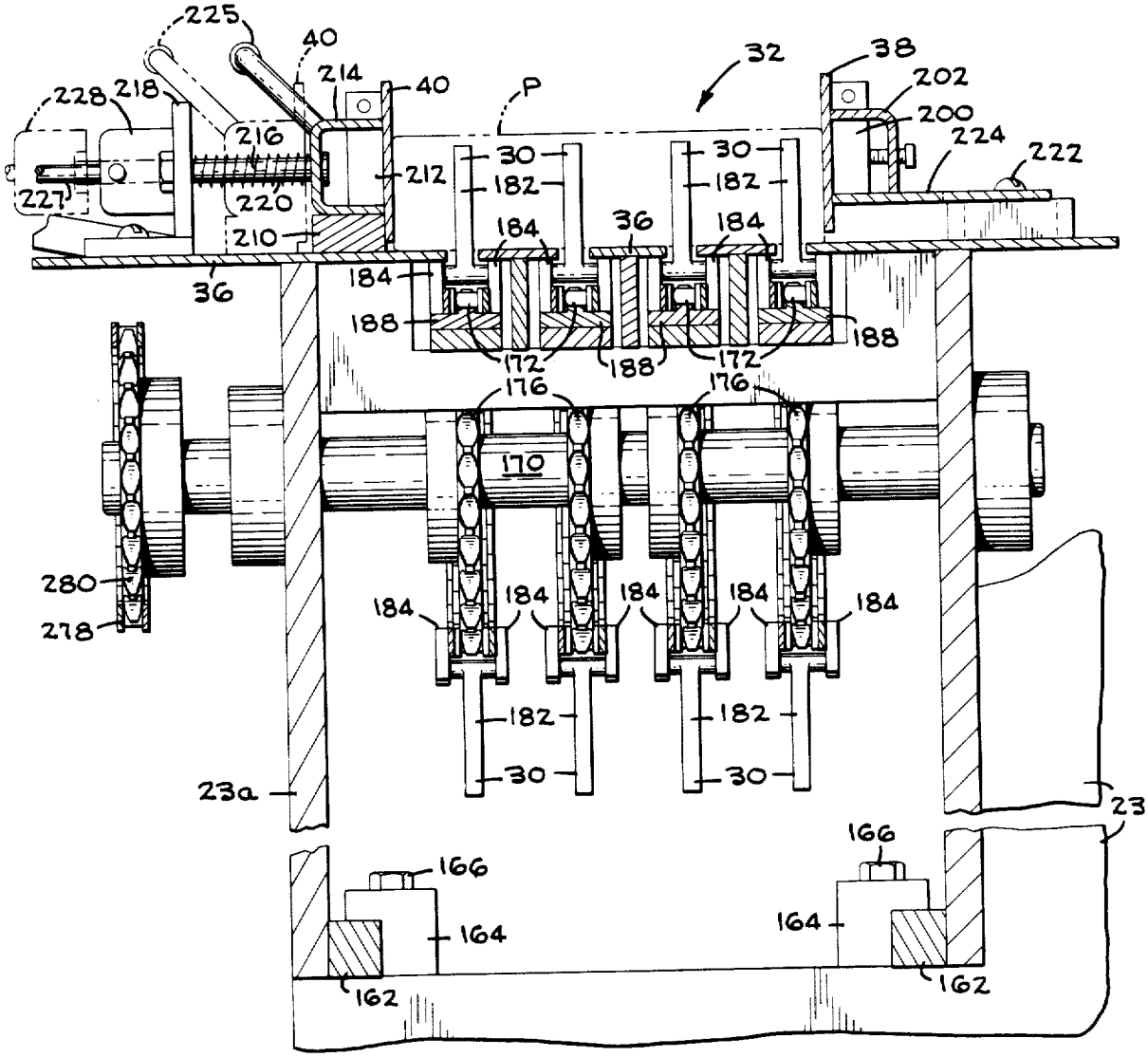
FIG. 4 is an enlarged section taken along the lines 4—4 of FIG. 1 illustrating the folding conveyor.
Figure 6:
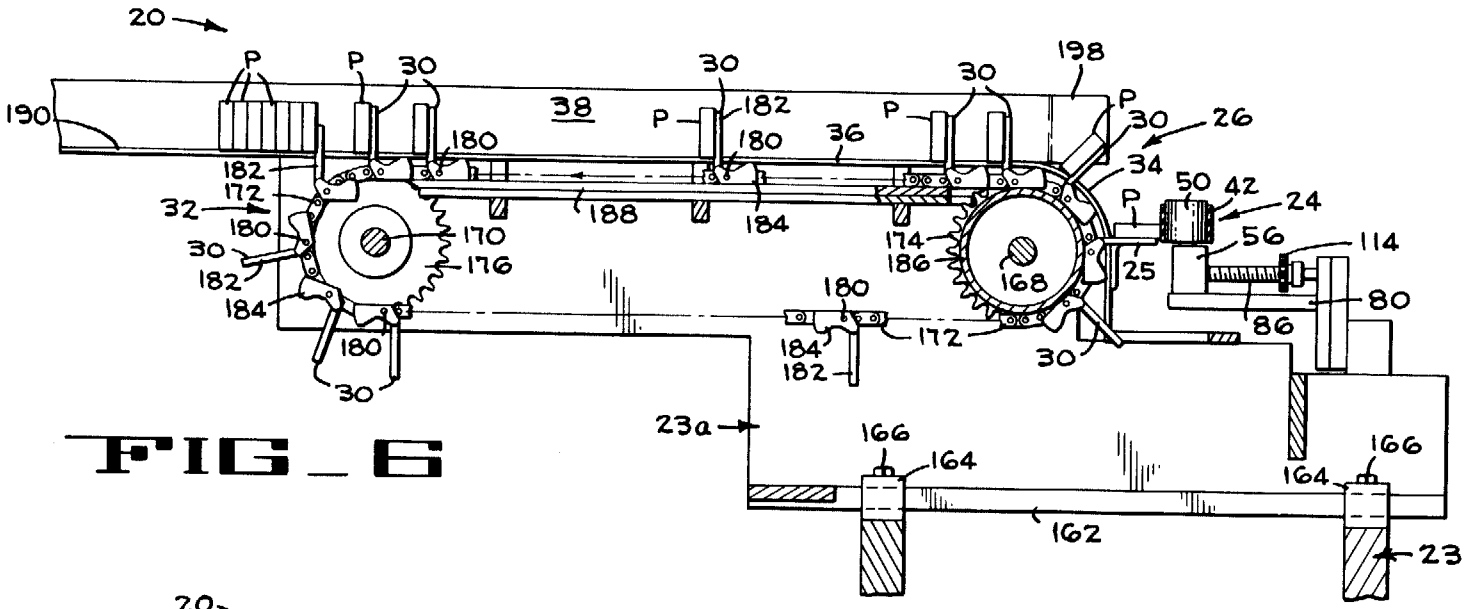
FIG. 6 is a section taken along lines 6—6 of FIG. 1.
Figure 5:
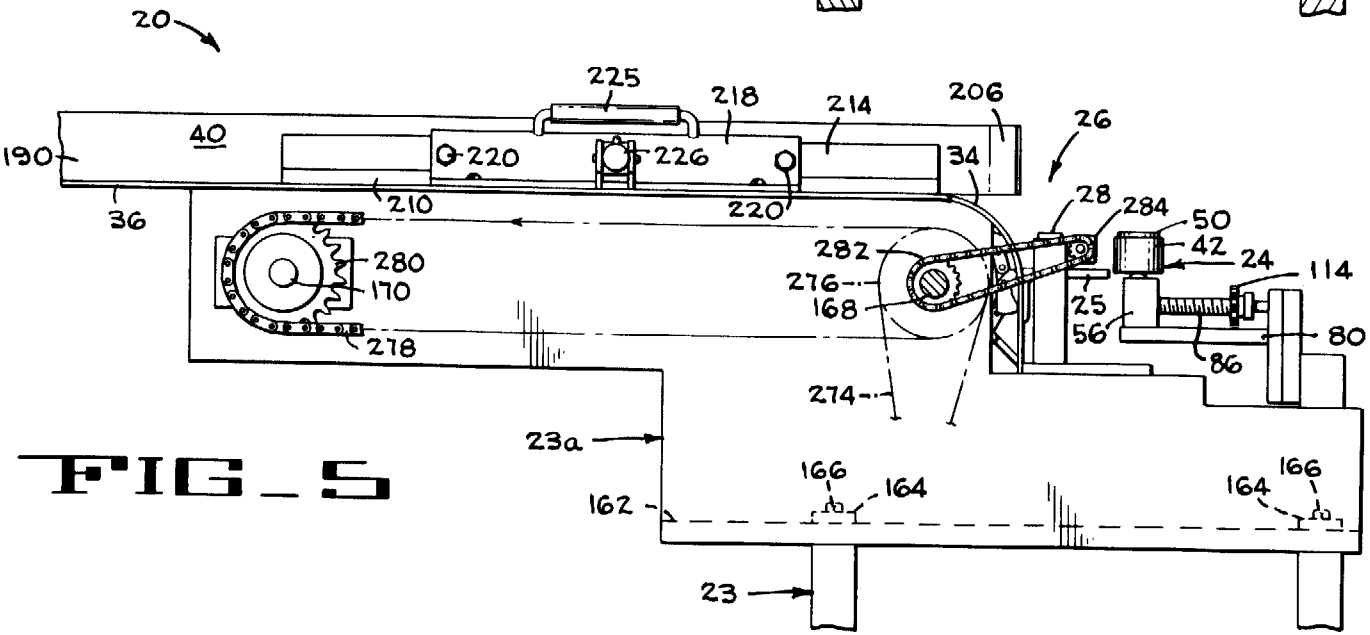
FIG. 5 is a side elevation of the apparatus looking in the direction of arrows 5—5 of FIG. 1, with portions being broken away.

The flap folding conveyor 32 is mounted on the frame 23a (FIGS. 1, 2, 4, 5 and 6) which is connected to the main frame 23 for adjustment transversely of the feed conveyor 24 by bars 162 secured to the frame 23a and slidably received in releasable clamps 164 of the main frame 23. After manually adjusting the frame 23a into the desired position, the frame 23a is locked in position by bolts 166 extending through holes in clamps 164 and screwed tightly into holes in the main frame 23 as best shown in FIGS. 4 and 6.

The flap folding conveyor 32 comprises a drive shaft 168 and a driven shaft 170 journaled in the frame 23a. Four endless chains 172 are trained around four spaced pairs of drive sprockets 174 and driven sprockets 176 keyed to shafts 168 and 170, respectively. A plurality of the previously mentioned, generally L-shaped pushers 30 are connected to each chain 172 at equally spaced intervals by pivot pins 180 (FIGS. 6 and 9). Each pusher 30 includes a package engaging finger 182 which extends through slots in the arcuate portion 34 and linear portion of the deadplate 36. The fingers 182 engage the packages P and advance them over the arcuate plate 34 and deadplate 36 for accumulation in abutting contact at the discharge end of the deadplate 36.

Each pusher 30 also includes a forked control portion 184 which straddles the associated chain and rides between large diameter hubs or drums 186 (FIG. 6) of the drive sprockets 174 and the arcuate portions 34 of slide plate 36 to maintain the pusher fingers 182 substantially radial of the drums 186 as they move through the transfer station 26. The linear portion of the slide plate 36 and an associated inner chain guide 188 (FIGS. 6 and 9) then maintains the fingers normal to the linear portion when the pushers 30 are moving between the sprockets 174 and 176. Shortly after the pusher fingers 182 move past the vertical plane of the driven shaft 170, the forked control portion of the fingers 182 move off the associated chain guide 188 permitting the pusher 30 to freely pivot as they move downwardly away from the packages. Thus, the packages P are pushed into abutting engagement on a package accumulating end portion 190 of the slide plate 36 for easy removal and without injury to the packages.

Folding shoes 38 and 40 (FIGS. 1 and 4–6) are provided in order to fold and seal the extended ends of flaps F (FIGS. 7 and 8) of the packages P against the ends of the body of the package P as indicated in FIGS. 8 and 9. The folding shoe 38 is rigidly secured to the frame 23a and includes an outwardly curved inlet end 198 adjacent the transfer station 26. A heat sealing bar 200 (FIG. 1) of standard well known design is disposed within a suitable housing 202 and abuts an elongated section of the shoe 38 to define a heat sealing shoe for heating that section to a sealing temperature of about 250° F.

The folding shoe 40 includes a curved or tapered inlet portion 206 at the transfer station 26 which serves to guide the packages P into the folding apparatus 20 from the feed conveyor 24. The shoe 40 is parallel to and spaced from the shoes 38 a distance substantially equal to the length of the article A within the package P. The shoe 40 is mounted for limited movement toward and away from the shoe 38 by a slide block 210 (FIG. 4) which slides along the upper flat surface of the slide plate 36. The shoe 40 further includes a section defining a heat sealing shoe engaged by a heat sealing bar 212 which is enclosed within a housing 214 and is heated to the desired sealing temperature. The heat sealing bars 200 and 212 are connected to a suitable source of electrical power (not shown). It will also be noted that the folding shoes and sealing shoes are preferably formed integrally with each other although they could be separately formed.

In order to apply sufficient pressure to fold and seal the package end flaps F against the adjacent ends of the body of the package, springs 216 (FIGS. 1 and 4) urge the shoe 40 toward the shoe 38 with a force of about ¼ pound per square inch. The springs 216 are disposed between an angle bar 218 secured to the slide plate 36 and the heating bar housing 214, and are also wound around cap screws 220 secured to the housing 214 and slidably received in holes in the angle bar 218.

It has been determined that when the heat sealing bars 210 and 212 are about 18 inches long and are heated to about 250° F., that the end flaps F will be bonded to the end wall of the bodies of the packages when the packages are spaced about three inches apart and are moved at the rate of 150 packages per minute.

The drawings illustrating the preferred embodiment of the flap folding apparatus 20 illustrates the apparatus when adjusted to handle packages having four rows of crackers that are four high with the four rows of pushers 30 being centered on the four rows of crackers. If it is desired to process shorter packages, for example packages containing three rows of crackers, the conveyor chain 172 nearest the folding shoe 38 is removed and the folding shoe 38 is manually moved toward the shoe 40 and is locked in the new position by capscrews 222 extending through holes and cooperating slots in the deadplate 36 and angle bracket 224 which adjustably mounts the folding shoe 38.

If the flap folding and sealing conveyor 32 stops while packages P of thermosealing material are engaged by the heated folding shoes 38 and 40, it has been determined that the end flaps of the packages will be scorched or otherwise damaged unless the sealing pressure is relieved. Accordingly, an insulated handle 225 (FIGS. 1 and 4) is secured to the spring loaded shoe 40 and may be pulled by an operator to merely relieve pressure on the package if the stoppage is of a short duration. If the stoppage is determined to last for a longer period, the operator may first relieve the pressure by pulling the handle 225, and may then manually remove the packages from between the shoes 38, 40.

Alternately, power means such as a solenoid or the illustrated air cylinder 226 may be provided. The cylinder 226 is supported by the angle bar 218 with its piston rod 227 connected to a yoke 228 secured to the middle capscrew 220 (FIGS. 1 and 4). When power is supplied to the motor of the packaging machine 22, a simple pneumatic-electrical control circuit (not shown) will vent the cylinder 226 permitting the shoes 40 to apply normal pressure to the end flaps as previously described. However, if the motor of the packaging machine stops, high pressure air will be directed into the cylinder 226 to retract the piston rod 227 thereby moving the adjustable shoe 40 to the released dotted line position of FIG. 4.

Figure 4A:
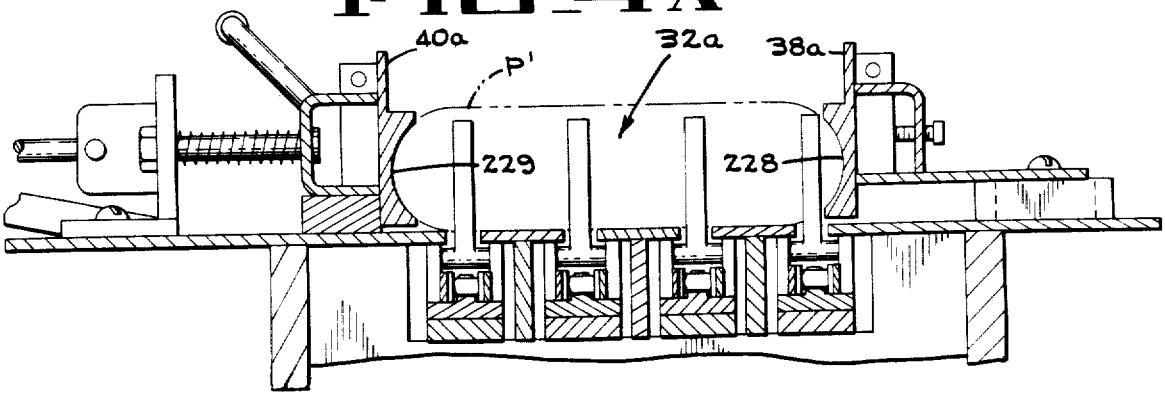
FIG. 4A is a fragment of a modified apparatus similar to the upper portion of FIG. 4 but adapted to handle round end packages.

The apparatus as above described is adapted to handle square ended packages P. FIG. 4A illustrates a modified flap folding conveyor 32a which is identical to the conveyors 32 except that the shoes 38a and 40a are provided with concave flap engaging shoes 228, 229 thus adapting the conveyor 32a to handle packages P' having rounded ends.

Figure 10:
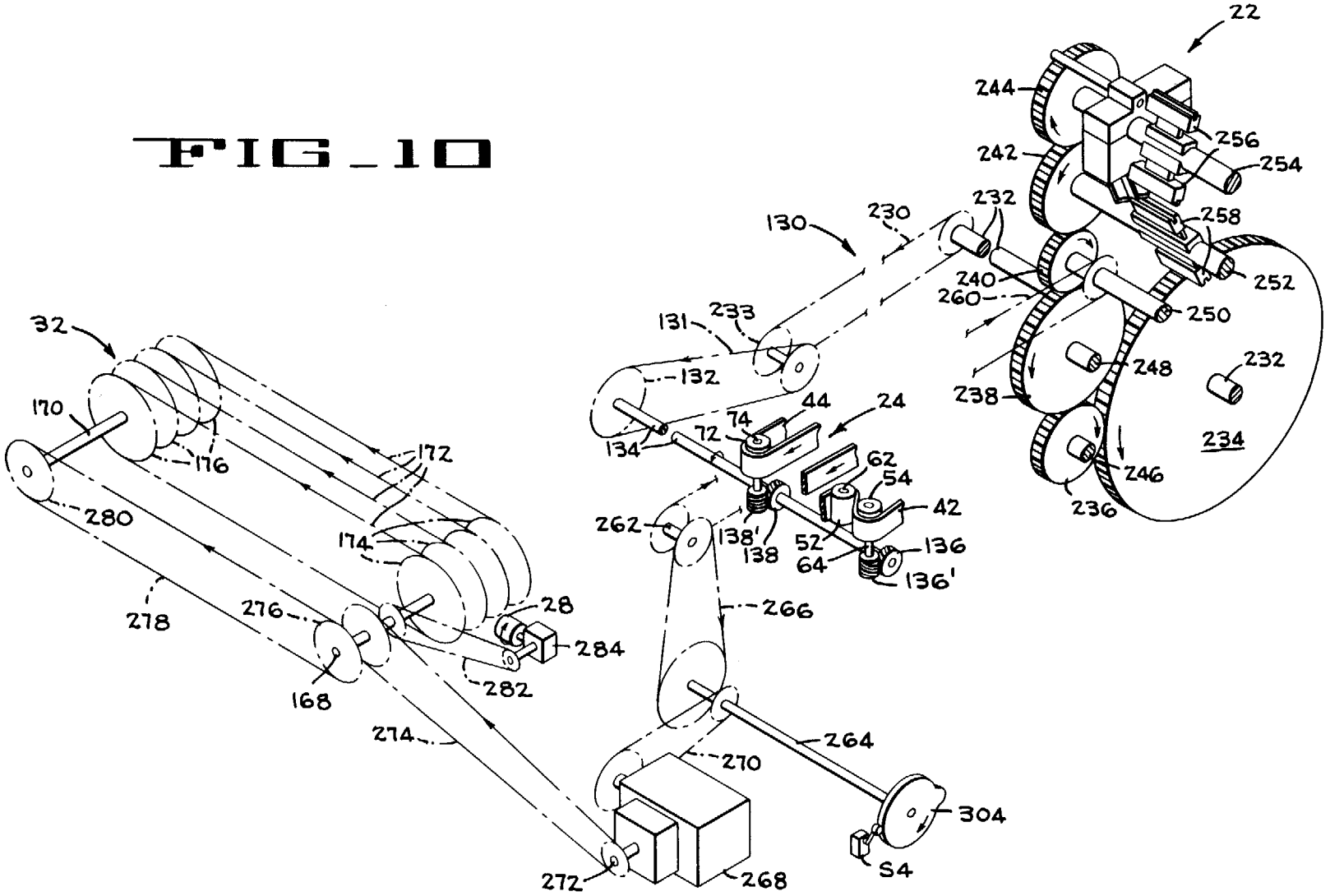
FIG. 10 is a diagrammatic perspective of the drive mechanism of the flap folding apparatus.

The drive mechanism 130 is diagrammatically illustrated in FIG. 10 and includes the chain drive 131 which drives the feed conveyor 24. The chain drive 131 receives its power from a chain drive 230 connected to a drive shaft 232 and to a double sprocket 233 on an idler shaft of the packaging machine 22. The packaging machine drive may be of the type disclosed in assignee's above referred to Aterianus application U.S. Ser. No. 581,993.

The drive shaft 232 is connected through a series of gears 234, 236, 238, 240, 242, and 244 mounted on shafts 232, 246, 248, 250, 252 and 254, respectively of the packaging machine for the purpose of driving the shafts and transverse sealing heads 256, 258 of the packaging machine in timed relation and in the directions indicated by the arrows in FIG. 10. A chain drive 260 connects the shaft 250 to a shaft 262. Shaft 262 is connected to a shaft 264 by a chain drive 266; and a right angle gear box 268 is driven by chain drive 270 from shaft 264. The output shaft 272 of the gear box 268 drives a chain drive 274 trained around a triple sprocket 276 on the flap folding conveyor drive shaft 168. A chain drive 278 connects the triple sprocket 276 to a sprocket 280 on the driven shaft 170 (FIGS. 5 and 6) of the flap folding conveyor 32; and another chain drive 282 connects the triple sprocket 276 to the input of a right angle gear box 284 which drives the flap contacting surface of the roller 28 downwardly.

The drive mechanism 130 is timed to drive the transverse sealing heads 256, 258; the feed conveyor 24; and the flap folding conveyor 32 in timed relation so that transversely sealed and severed packages P from the transverse sealer 256 and 258 are firmly gripped and accelerated by the feed conveyor 24 to space the packages predetermined distances (about ½ package length) from each other. The feed conveyor 24 advances each package P, in turn, against the abutment or roller 28 which urges the leading end flap downwardly shortly before an aligned row of pushers 30 engage the associated package P and move the package over the arcuate portion 34 and then the flat portion of the slide plate 36 for folding and sealing the flaps F to the ends of the body of the package.

As indicated previously, one of the reasons the end flaps F of the package P are sealed to the ends of each package is so that they can be reliably dispensed from a coin operated dispensing machine or the like. It has been determined that extended or partially extended flaps, or partially unsealed packages frequently cause jams in such vending machines.

It has been determined that defective packages occur quite frequently during starting and stopping of the wrapping machine since the packages lose their desired positions or are improperly sealed at this time. Accordingly, an electrical circuit 300 (FIG. 11) is provided to control the position of the cylinder 154 to open the reject mechanism or gate 146 to its reject position as illustrated in dotted lines in FIG. 2 for about 3 seconds after start-up of the packaging machine 20.

The circuit 300 receives its power from main line L1 and L2. Closing of the start-stop switch S1 energizes relay R1 closing normally open relay contacts R1-1 and R1-2. Closing of R1-1 starts the motor (not shown) and other components of the packaging machine 20, while closing of relay contact R1-2 starts the motor of an adjustable timer 302 which is preferably set for about 3 seconds prior to closing a circuit to relay R2. During this 3-second interval, synchronizing cam 304 will actuate limit switch S4 to energize relay R3 through a holding or latching circuit; which latching circuit includes switch S4, normally closed relay contact R2-1 and relay R3. Energization of relay R3 closes relay contacts R3-1 and R3-2. When the lobe of cam 304 moves away from switch S4, the holding circuit for relay R3 is established through closed relay contact R3-1 and closed contact R2-1 thereby maintaining energization of solenoid SOL-1 of spring return, 4 way air valve V to hold the valve in the illustrated parallel passage position. When the valve V is in the illustrated position, high pressure air enters the cylinder 154 to retract the piston and place the reject mechanism 146 in the reject position as illustrated in solid lines in FIG. 11. The rejected packages may be collected by any suitable means (not shown).

In order to prevent movement of the gate 146 in either direction when a package P is unacceptably positioned, the timing switch S4 is actuated by cam 304 only when it is safe for switching properly positioned packages. The switch S4 is operated by the cam 304 which is secured to shaft 264 which makes one revolution per package processed by the package folding apparatus of the present invention.

Approximately 3 seconds after startup of the packaging machine, timer 302 closes the circuit to energize relay R2 and relay contact R2-1 opens. In order to prevent the reject mechanism 146 from closing upon a package that is partially through the reject mechanism, relay R3 and solenoid SOL-1 remain latched through relay contact R3-2 until the synchronizing cam momentarily actuates switch S4 to open the latching circuit. This deenergizes relay R3 and solenoid SOL-1 causing the spring-loaded valve V to move to its cross-passage position causing high pressure air to enter over the piston of cylinder 154 and move the reject mechanism 146 to its operative, non-reject or closed position illustrated in dotted lines in FIG. 11. The closed reject mechanism 146 then permits the packages to move into the transfer section 26 for acceptance by the flap folding and sealing conveyor 32 in timed relationship with the movement of the pushers 30 of the folding conveyor 32.

Figure 11:
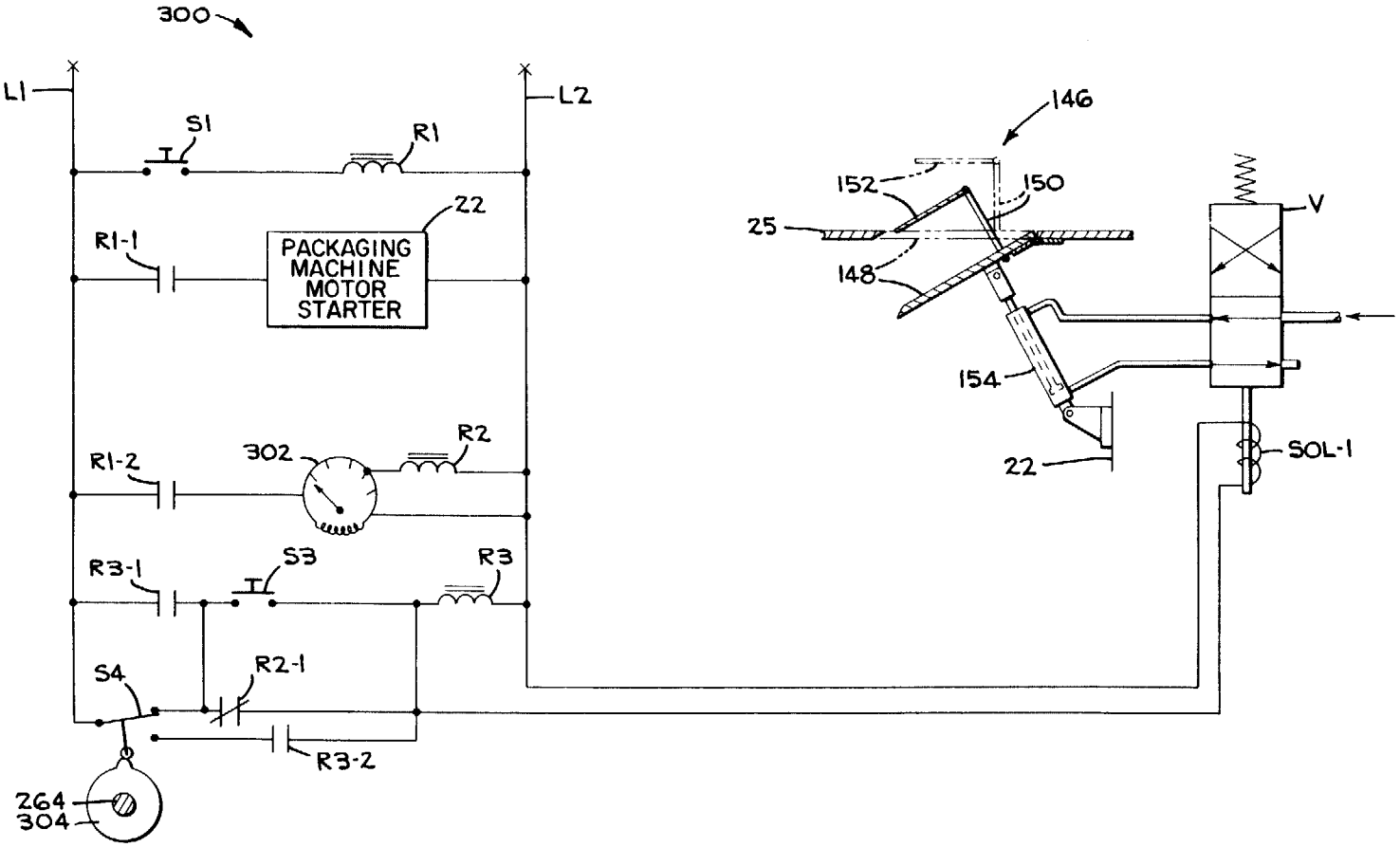
FIG. 11 is an electrical diagram illustrating the circuit for controlling the reject mechanism.

If an operator detects defective packages during normal operation of the apparatus 20, he may reject the packages by momentarily closing a manual reject switch S3 which enables a synchronized energization and deenergization of solenoid SOL-1 to open and close reject mechanism 146 and reject a selected group of defective packages P. More particularly, upon closing switch S3, relay R3 will become energized only upon movement of switch S4 to the illustrated position by the lobe of cam 304. Relay R3 is then energized through a circuit from line L1 to line L2 which includes the closed switches S4 and S3. Energization of relay R3 closes relay contacts R3-1 and R3-2. While switch S3 is closed, relay contact R3-1 and switch S3 establish a holding circuit to relay R3. When switch S3 is opened and switch S4 is contacting the lower portion of the cam 304, relay R3 will not immediately be deenergized but will remain energized by a circuit which includes switches S4 and relay contact R3-2 until the switch S4 is again engaged by the lobe of cam 304 thus breaking the holding circuit as illustrated in FIG. 11. In this way, the reject mechanism 146 will not close on a package but will close in timed relation to the movement of the packages in response to the synchronizing cam 304.

Although the operation of the flap folding apparatus 20 of the present invention has been included along with the description of the several components of the apparatus, a brief summary of the operation will now be given.

In operation, crimped extended end packages P (FIG. 7) are formed about articles A by the packaging machine 22 (FIG. 1) and are then spaced and advanced one at a time onto the deadplate 25 at the rate of about 150–240 packages per minute. Four inch long packages have been successfully run at 240 packages per minute while six inch packages have been successfully run at 200 packages per minute. The leading flap of each package P engages the roller 28 and is urged downwardly thereby. The continuously driven pushers 30 then transfer the packages P about 90° and advance them between the folding shoes 38 and 40. The folding shoes first firmly engage and fold the extended flaps F rearwardly against the adjacent end of the articles A. Thereafter the packages P are moved along surfaces heated by elements within enclosures 202 and 214 to seal the end flaps F to the ends of the package P. During this time the springs 216 apply a force of approximately ¼ pound per square inch against the ends of the package P, which force is resisted by the articles A within the body of the package. The packages with their flaps F sealed against the article A is illustrated in FIG. 8, are then pushed along the package supporting plate 36 and are accumulated in abutting contact on the discharge end 190 (FIG. 6) of the plate 36 when the control portions 184 of the pushers 30 move off the trailing end of the guides 188 and the trailing sprockets 176 pull the pusher fingers 182 of the freely pivoted pushers 30 downwardly through the slots and the plate 36. The accumulated packages are periodically removed from the accumulating end portion 190 of the plate 36 either manually by operators or by conveying devices for placement of the packages into cartons, cases or the like.

Although the preferred embodiment of the invention is intended for use with packages made from thermosealing material, it will be understood that the flap folding apparatus 20 of the present invention may also be used with packages made of other types of packaging material. For example, any packaging material which will take a permanent set, such as aluminum foil packages, may also be passed through the flap folding machine 20 to fold the flaps against the ends of the articles. When handling such packaging material, the heating elements 200 and 212 need not be energized.

It will also be understood that it is within the scope of the invention to orient the flap folding conveyor 32 of the flap folding apparatus 20 to the right of the centerline of the packaging machine 22 either in an inclined attitude or horizontally as illustrated in FIG. 1, to orient the apparatus to the left of the centerline of the machine either horizontally or incline, or to orient the apparatus vertically. If the folding conveyor 32 is oriented vertically, it is apparent that the packages need not be pivoted 90° before the end flaps are folded and sealed.

It is apparent from the foregoing description that the flap folding apparatus of the present invention is effective to permanently fold the end flaps of the packages against the ends of the body of the package thereby foreshortening the over-all package length to approximately that of the article itself. Thus, smaller and less expensive boxes are required to store and ship the packages and packages present a pleasing appearance for added customer appeal. The apparatus simply and effectively moves the packages between folding shoes, and if thermosealing packaging material is being used, between heated sealing shoes to assure permanent folded and bonded conditions of the flaps. The apparatus is adjustable to accommodate packages of different lengths and widths and is also effective to accumulate the completed packages in abutting relationship for easy removal from the apparatus. The apparatus also includes a feed conveyor which frictionally grips the sides of the packages and reliably feeds them into the flap folding conveyor. A reject mechanism automatically rejects packages from the feed conveyor for a predetermined period at the beginning of each packaging cycle of operation, and at periods when jogging of the packaging machine is found to be necessary. The reject mechanism may also be manually activated during normal operation when a defective package is visibly detected by the operator.

Although the best mode contemplated for carrying out of the present invention has been herein shown and described, it will be apparent that modification and variation may be made without departing from what is regarded to be the subject matter of the invention.

I claim:

1. An apparatus for folding the outwardly projecting end flaps of filled, spaced, and sealed packages against the ends of the bodies of the packages comprising: feed conveying means for *frictionally* engaging and moving each package longitudinally of its length completely into a transfer station before disengagement from the package, *said feed conveying means comprising opposed conveyor belts receiving the package therebetween to thereby effect such frictional engagement, one of said belts terminating short of said transfer station while the other extends into the transfer station and thereby tends to controllably feed the package to the transfer station,* abutment means for engaging the leading flap of the package and urging said leading flap downwardly while terminating longitudinal movement of the package, a deadplate for receiving the package at said transfer station, means defining at least [one opening] *two spaced openings* in said deadplate *of such dimension that the package bridges the openings when located onto said deadplate,* driven endless flap folding conveying means extending transversely of said feed conveying means and having an input end disposed adjacent said deadplate and an output end, a plurality of pushers pivotally connected to said flap folding conveying means at evenly spaced intervals and being movable through said [opening] *openings* in said deadplate and along a predetermined path, means for maintaining said pushers normal to said predetermined path from said input end to a pusher withdrawal point adjacent said output end, a package supporting plate cooperating with said pushers for slidably supporting the package advanced by said flap folding conveying means, folding means on opposite sides of said path positioned to engage the end flaps of the package and fold them rearwardly against the ends of the package as the package moves therepast, and a motor for driving said conveying means.

2. An apparatus according to claim 1 wherein said package supporting plate includes an arcuate input section and a horizontal flap folding section, said arcuate section cooperating with said pushers to pivot the package approximately 90° while entering into frictional sliding engagement with said flap folding means.

3. An apparatus according to claim 1 wherein said package supporting plate includes an accumulating portion extending downstream of said output end of said conveyor [of] *for* moving the spaced packages with folded flaps into abutting engagement on said support plate prior to withdrawal of said pushers from said package supporting plate at said withdrawal point.

4. An apparatus according to claim 1 wherein each of said packages is formed from thermoplastic wrapping material and additionally comprising heating means on an opposite side [of] *for* said path of heating said wrapping material to a temperature sufficient to bond the end flaps to the ends of the body of the package.

5. An apparatus according to claim 4 wherein said heating means includes a heat sealing shoe on each side of said path for heating the flaps as they move [the] therepast and for maintaining the flaps in folded condition while being heated.

6. An apparatus according to claim 5 and additionally comprising resilient means for urging at least one of said heat sealing shoe against said package with a predetermined sealing force.

7. An apparatus according to claim 6 wherein said sealing force of about ¼ pounds per square inch and a temperature of about 250° F. are required when the heat sealing shoes are 18 inches long and when the packages are spaced about 3 inches apart and are moving at the rate of between about 150–240 packages per minute.

8. An apparatus according to claim 2 wherein said packages are each formed from thermosealing wrapping material, and additionally comprising heating means on opposite sides of said path for heating said wrapping material to a temperature sufficient to bond the end flaps to the ends of the body of the package.

9. An apparatus according to claim 1 wherein said feed conveying means comprises a package support deadplate, a pair of driven endless conveyors positioned to frictionally engage the side edges of each package supported by said plate for moving said package into said transverse station, one of said endless conveyors terminating short of said transfer station and the other endless conveyor extending into said station to move the package against said abutment.

10. An apparatus according to claim 9 and additionally including means for adjusting the spacing between the package contacting surfaces of the pair of endless conveyors for accommodating packages of different widths.

11. An apparatus according to claim 1 and additionally comprising a package reject mechanism associated with said feed conveying means for preventing certain packages from entering said transfer station, and power means for actuating said reject mechanism.

12. An apparatus according to claim 11 and additionally comprising control means for automatically activating said power means for moving said reject mechanism to its package rejecting position for a predetermined time interval in response to starting said motor.

13. An apparatus according to claim 12 wherein said control means additionally includes a cam synchronized with the movement of the packages and effective to momentarily actuate a synchronizing switch which allows operation of said power means only when the spaced packages are free from interfering with the movement of the reject mechanism.

14. An apparatus according to claim 13 wherein said control means additionally includes a manually operable switch for operating said reject mechanism to reject packages from said feed conveying means in timed relation with the movement of the packages therealong.

15. An apparatus according to claim 9 wherein said package supporting deadplate has a reject opening therein, and additionally comprising a package reject mechanism associated with said conveying means for preventing certain packages from entering said transfer station, said reject mechanism including a floor plate pivoted to said package supporting deadplate and adapted to be moved between a position closing said reject opening to a position opening said reject opening, a package deflecting plate secured to said floor plate and movable between a position spaced above the path of movement of the packages when the reject opening is closed, and angled downwardly into the path of movement of the packages to deflect packages out of said reject opening when said floor plate is moved to an open position, and power means for pivoting said reject mechanism between its two positions.

16. An apparatus according to claim 15 and additionally comprising control means for automatically activating said power means for moving said reject mechanism to its package rejecting position for a predetermined time interval in response to starting said motor.

17. An apparatus according to claim 16 wherein said control means additionally include a cam synchronized with the movement of the packages and effective to momentarily actuate a synchronizing switch which allows operation of said power means only when the spaced packages are free from interference with the movement of the reject mechanism.

18. An apparatus according to claim 17 wherein said control means additionally includes a manually operable switch for operating said reject mechanism to reject packages from said feed conveying means in timed relation with the movement of the packages therealong.

19. An apparatus according to claim 1 wherein said abutment means is a driven roller having its flap contacting surface driven downwardly to urge the foremost end flap downwardly.

20. An apparatus for receiving elongated filled packages with extended end flaps from a wrapping machine and thereafter folding the end flaps of only properly formed packages against the ends of the body of the packages comprising: feed conveying means including a pair of *opposed* endless belts for frictionally engaging opposite side walls of the packages *therebetween* ep for moving the packages along a first path in a direction parallel to the longitudinal axis of the packages *toward a transfer station wherein one of said belts terminates short of said transfer station while the other extends into said transfer station and thereby tends to controllably feed the packages to said transfer station*, a first slide plate for supporting the packages as they are moved by said belts, and defective package rejecting means for forcibly deflecting defective packages from said first path; flap folding means including a [slotted] *second* slide plate *being slotted and* having a flat portion and an arcuate input end, endless folding conveyor means having a plurality of lugs spaced at even intervals therealong and projecting through the slots in said [slotted] *second* slide plate for engaging the packages received from the feed conveyor and for moving packages along a second path in a direction normal to the longitudinal axes of the packages, folding means on opposite sides of said second path positioned to engage the end flaps and fold them rearwardly as each package moves therepast; and means defining a transfer [section] *station* between said feed conveying means and said flap folding [conveyor] *means* including a slotted deadplate disposed in planar alignment with said first slide plate and at an elevation lower than that of the flat portion of said second slide plate for receiving and supporting the packages discharged from said first slide plate *wherein the slots of said deadplate are of such dimension that the packages bridge said slots when located on said deadplate*, and an abutment means for terminating movement of the packages *into said transfer station* received from said feed conveying means in position to be accepted by the lugs of said folding conveyor means, said folding conveyor means being effective to pivot the packages 90° as the packages are moved [around] *over* the arcuate portion of said [slotted] *second* side plate.

*21. An apparatus for folding the outwardly projecting end flaps of filled, spaced, and sealed packages against the ends of the bodies of packages comprising: feed conveying means having at least one upright surface for frictionally engaging and moving each package longitudinally of its length into a transfer station, said feed conveying means comprising opposed conveyor belts receiving the package therebetween to thereby effect such frictional engagement, one of said belts terminating short of said transfer station while the other extends into the transfer station and thereby tends to controllably feed the package to the transfer station, abutment means for engaging and terminating longitudinal movement of the package, a deadplate at said transfer station, said deadplate serving to receive and support a package disposed thereon by said feed conveying means, at least two apertures in said deadplate, said apertures being of insufficient size to allow the package to pass therethrough or to snag thereon, driven endless flap folding conveying means extending transversely of said feed conveying means for moving the package along a predetermined path, a plurality of pushers pivotally connected to said flap folding conveying means at evenly spaced intervals and being movable through said apertures in said deadplate and along a predetermined path, a package supporting plate cooperating with said pushers for slidably supporting the package advanced by said flap folding conveying means, folding means on opposite sides of said path positioned to engage the end flaps of the package and fold them rearwardly against the ends of the package as the package moves therepast, and power means for driving said conveying means.*

*22. An apparatus for folding the outwardly projecting end flaps of filled, spaced, and sealed packages against the ends of the bodies of the packages comprising: feed conveying means for frictionally engaging and moving each package longitudinally of its length completely into a transfer station before disengagement from the package, resilient means urging said feed conveying means into firm frictional gripping engagement with the packages while moving said packages into said transfer station, said feed conveying means comprising opposed conveyor belts receiving the package therebetween to thereby effect such frictional engagement, one of said belts terminating short of said transfer station while the other extends into the transfer station and thereby tends to controllably feed the package to the transfer station, abutment means for engaging the leading flap of the package and tending to urge said leading flap downwardly while terminating longitudinal movement of the package, a deadplate for receiving and supporting the package at said transfer station and having an upper surface in planar alignment with the lower surfaces of the foremost package advanced by said feed conveying means, means defining at least two spaced slots in said deadplate of such dimension that the package bridges said slots when positioned onto said deadplate, driven endless flap folding conveying means extending transversely of said feed conveying means and having an input end disposed adjacent said deadplate and an output end, a plurality of pushers pivotally connected to said flap folding conveying means at evenly spaced intervals and being movable through said spaced slots in said deadplate for transferring the packages from said deadplate and along a predetermined path, a package supporting plate cooperating with said pushers for slidably supporting the package advanced by said flap folding conveying means for maintaining said pushers normal to said predetermined path from said input end to a pusher withdrawal point adjacent said output end, folding means on opposite sides of said path positioned to engage the end flaps of the package and fold them rearwardly against the ends of the package as the package moves therepast, and power means for driving said conveying means.*

* * * * *